RANDOM NOISE GENERATOR HAVING GAUSSIAN AMPLITUDE PROBABILITY DISTRIBUTION

Filed Jan. 18, 1967 2 Sheets-Sheet 1

INVENTOR.
Alfred G. Ratz
BY
Roy L. Parsell
ATTORNEY.

INVENTOR.
Alfred G. Ratz
BY
Roy L. Parsell
ATTORNEY.

United States Patent Office
3,456,208
Patented July 15, 1969

3,456,208

RANDOM NOISE GENERATOR HAVING GAUSSIAN AMPLITUDE PROBABILITY DISTRIBUTION

Alfred G. Ratz, Peck Hill Road, Woodbridge, Conn. 06525

Filed Jan. 18, 1967, Ser. No. 610,061
Int. Cl. H03b 29/00
U.S. Cl. 331—78 10 Claims

ABSTRACT OF THE DISCLOSURE

An apparatus for generating random noise signals having a true Gaussian probability distribution and a flat band-limited spectrum, absolutely known in terms of voltage and frequency. In the preferred embodiment the apparatus is made up of a noise driver, a fixed frequency generator, electronic gate circuits, a two-stage circuit, and a narrow band filter. The noise driver consists of a primary noise source such as a noise diode, noise tube or the like driving a binary counter. This binary counter is used to randomly control the electronic gate circuits to regulate the passage of the fixed frequency signal to the inputs of the two-stage circuits in order to produce a wave form of rectangular alternations. This wave form is fed to the narrow band filter to yield the final output. A second embodiment relies on a single gate and a single noise output state while a third embodiment similar to the second embodiment omits the fixed frequency generator.

Random noise generator

This invention relates to an electronic device for generating signals of normally distributed randomly variable amplitudes and in particular to a random noise generator having known precise characteristics, hence suitable for testing and qualification of electronic and electromechanical systems.

Conventionally, random noise generators have used some such primary noise source as for example: (1) gas thyratron in a transverse magnetic field, or (2) a noisy Zener diode. The noise signals put out by such devices do not have true Gaussian amplitude probability distributions. Both their amplitude probability density plots and their power spectral density plots do not strictly follow any desired function and vary widely. Furthermore, such devices are sensitive to aging, previous history, temperature and operating parameters so that their output cannot be considered as a stationary time series and therefore do not provide practical precise standards for testing purposes.

Hence it is an object of the present invention to provide a random noise generator whose output signal has statistical and other pertinent properties that are accurately established when the generator is constructed and remain constant through the life of the device.

It is another object of the present invention to provide a random noise generator whose output signal has statistical and other pertinent properties that conform to the desired characteristics and values within known well-established tolerances.

It is still another object of the present invention to provide a random noise generator whose output signal has statistical properties and levels that are independent of the quality of the noise generated in the primary noise source.

And a still further object of this invention is to provide a random noise generator whose output signal can be used as a standard random noise.

And a further object is to provide a random noise generator whose signal has statistical properties determined by physical quantities traceable to those maintained at the United States Bureau of Standards rather than by cumbersome and inaccurate statistical measurements.

While another object is to provide a random noise generator which produces a signal having both a Gaussian probability distribution and a band limited flat spectral distribution.

Other objects, advantages and novel features of the invention will become apparent from the following detailed description of the invention when considered in conjunction with the accompanying drawings wherein.

General description

Figures 1, 2, 3:
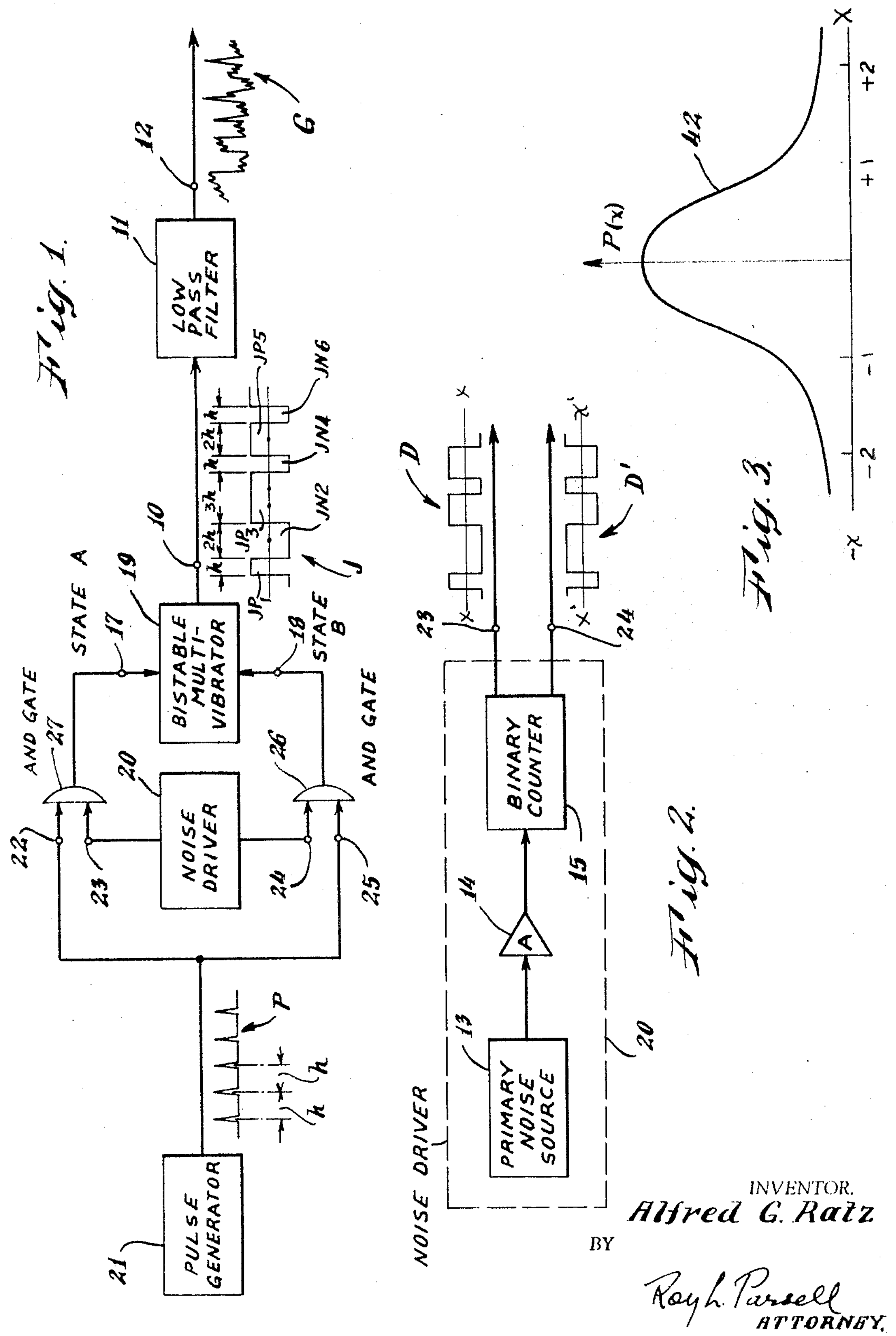
FIGURE 1 is a schematic diagram of the preferred form of the invention.
FIGURE 2 is a schematic diagram of the noise driver shown in FIGURE 1.
FIGURE 3 is a graph illustrating the amplitude probability distribution according to the normal or Gaussian law.

Referring now to FIGURE 1 showing the preferred embodiment, numeral 19 denotes a bistable multivibrator having two stable states referred to as state A and state B. A pulse received by multivibrator 19 via path 17 causes it to settle into state A and in a similar manner a pulse received via path 18 causes it to settle into state B.

The circuits made up of the pulse generator 21, the identical AND gates 26 and 27, and the noise driver circuit 20 combine to feed pulses randomly to the two input points 17 and 18 of multivibrator 19. The probability with which such pulses appear at point 17 or point 18 follows a known law, so that the statistical properties of the output signal J of the multivibrator 19 which appear at point 10 are fully known.

The signal wave J at point 10 is fed to a low pass filter 11 which has a pass band width B much narrower than the frequency content of the signal wave J at point 10. The effect of the filter 11 is to destroy the clipped nature inherent in the square wave J signal from the multivibrator 19 and convert this wave J signal into a true Gaussianly-distributed wave G signal random noise.

Since the signal wave J at point 10 has known statistics, and provided the characteristics of the low pass filter 11 are known, a random noise signal G with the property of true Gaussian distribution (FIGURE 3) results having a precise standard of known statistical properties of the elements comprising the invention.

Detail description of preferred embodiment

The known statistics produced by the circuit consisting of a bistable multivibrator 19, noise driver circuit 20, pulse generator 21 and AND gates 26 and 27 are those of a random telegraph signal.

The pulse generator 21 produces short sharp pulses (wave P) at a repetition rate of $1/h$ Hz. (see FIGURE 1). These pulses appear simultaneously at the inputs 22 and 25 of AND gates 27 and 26 respectively.

Each AND gate has a second input at points 23 and 24 for gates 27 and 26 respectively (FIGURE 1). The signals at points 23 and 24 are in phase opposition of 180° so that when the signal at 23 opens gate 27 the signal at 24 closes gate 26.

The operation of the noise driver circuit 20, which will be described in detail later, is such that it insures a fifty-fifty chance that a given pulse P appearing at points 22 and 25 can pass through a given gate and also that the said chance is in no way influenced by conditions at the time of any particular pulse that occurred $h$ seconds previously.

The foregoing situation is analogous to flipping a coin each time a pulse P appears from the pulse generator 21. If the coin lands "heads," gate 27 would be open; if the coin lands "tails," gate 26 would be open. Thus assuring that there is a 50% change that the pulse reaches multivibrator 19 via point 17 setting the multivibrator 19 to state A, and a 50% chance that the pulse reaches multivibrator 19 via point 18 setting it to state B.

If the multivibrator 19 was already in state A, a pulse via point 17 would not change the state; it would continue in state A. Similarly, if it was in state B, a pulse via point 18 would not change its state.

Each flip of the coin is independent of the previous flip, and has no effect on the way the coin lands for the next flip. In the same way, there is a complete independence of the probability of the pulse appearing at point 17 or point 18, from the path of the previous pulse. The previous pulse path has no effect on future pulses. All this is achieved by the noise driver circuit 20 to be more fully described.

It is obvious that the success and practical utility of the invention is closely tied up with the circuit configuration of the noise driver 20 as shown in FIGURE 2. It must have exactly 50:50 influence on AND gates 26 and 27 and its influence must be independent of what happened $h$ seconds or more previous in time.

Noise driver 20 (see FIGURE 2) comprises three main sections. First, a primary noise source 13 which may be a noise diode (noisy Zener diode), a gas thyratron in a transverse magnetic field, or any other device producing a noise-like signal with fairly wide frequency components. Second, an amplifier 14 which may be optional depending on the need for such, to increase the signal from source 13 to a level suitable for further manipulation. Third, a binary counter 15 for converting the raw noise signal, when the strength reaches a predetermined level, for which the binary counter 15 is set, into a form of signal that simulates the coin flipping analogy above for actuating the AND gates 26 and 27. Thus the binary counter 15 performs three essential tasks. Task 1 converts the raw noise from source 13 into two clipped waves D and $D^1$ (see FIGURE 2) in phase opposition of 180°, one positive and the other negative. As shown in FIGURE 2, the portion above the axis XX of wave D being positive and the portion above the axis $X^1X^1$ of wave $D^1$ being positive. These two waves D and $D^1$ are therefore suitable for driving the AND gates. Task 2 provides the probability of a given output wave being positive (and hence able to energize its corresponding AND gate) that is exactly 50:50. Task 3 provides the probability of the polarity of a given output wave D or $D^1$ at any instant of time being independent of the state of the wave at any previous time $h$ seconds or greater having no effect on the state of the wave at any later time $h$ or greater. All three tasks must tbe satisfied simultaneously.

For each pulse from the primary noise source 13, which is of such level as to affect the binary counter 15, the binary counter changes state.

The frequency content of the primary noise source 13 must be sufficient to permit sufficient changes of state in a time period $h$ so that the state after the time interval $h$ is not affected in any way by the state at the beginning of the time interval $h$. It turns out that the upper frequency component of the noise from the source 13 need exceed $1/h$ by a factor of only two, for the statistical independence to be achieved. The randomness of the wave form J (FIGURE 1) is thus subject to the whims of the noise driver circuit 20 sampled by pulse P and is obviously independent of the time interval $h$ and the pulse P from the pulse generator 21 sets the random law which wave form J follows.

The bistable multivibrator 19 converts the signal wave into a clipped or square wave J shown at point 10 (FIGURE 1). It will be observed that the duration of each positive alternation $JP_1$, $JP_3$, etc. or each negative alternation $JN_2$, $JN_4$, etc. of wave J is randomly distributed. The probability of the wave being of a given polarity is exactly 50:50.

By again referring to wave form J (FIGURE 1) the probability of each alternation ($JP_1$, $JP_3$, etc.) varying is graphically illustrated. Alternation $JP_1$, having length $h$ has a 50% chance of occurring. Alternation $JN_2$ of length $2h$ has a 25% chance of occurring. Alternation $JP_3$ of length $3h$ has a 12½% chance of occurring. Thus the lengths of the alternations follow a binary probability distribution. The wave at point 10 is also perfectly symmetrical as to amplitude from a statistical point of view. All its statistics are known.

Thus at point 10 the output of the bistable multivibrator 19, a wave form J is generated having alternations $JP_1$, $JN_3$, etc. of varying lengths ($1h$, $2h$, $3h$, etc.) randomly distributed according to a known binary law due to the duration of the train of pulses allowed to pass through the AND gates (26 and 27) subject to the whims of the noise driver circuit 20.

Figure 4:
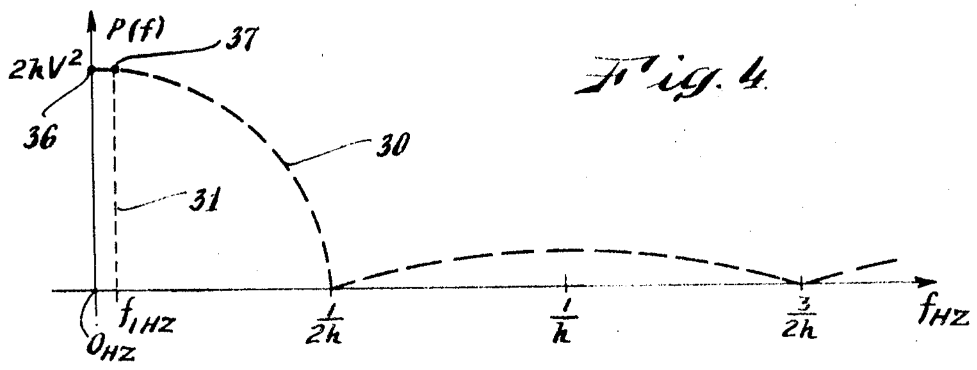
FIGURE 4 is a graph illustrating the power spectral density.

The wave J at point 10 has a power spectral density as shown on the plotted graph in FIGURE 4 of curve 31 where the ordinates $P(f)$ represent the power spectral density and the abscissae frequency, $f$. The solid line 36–37 is flat from 0 Hz. to a frequency $f_1$ Hz. The power spectral density represented by the line 36–37 can be shown to be uniquely determined as a function of the amplitude of the wave J and of the time interval $h$. It is this fact that makes the generator a time noise standard since the spectral properties can be calibrated against a voltage and a time interval; hence quantities can in turn be traced to primary standards. It therefore comprises an important essential feature of my invention. The remainder of curve 30 is known and it depends on the probability law regarding the length of each alternation and is of course known.

Only the flat portion of the curve 30 in the region of zero frequency is to be used i.e. 36–37, the remainder being eliminated by the pass band B of filter 11. The power spectral density (see FIGURE 4) is represented by curve 31. Therefore it is obvious that filter 11 must convert the spectrum of the signal J at point 10 into a flat white spectrum. The filter 11 simultaneously performs another important function as follows.

Since the band width B of filter 11 is small compared to the total spectral content of the signal at point 10 (see FIGURE 1) the rise time of the filter must be very long when compared to the duration of a given alternation of the signal at point 10 such as $JP_1$, $JP_3$, $JN_2$, $JN_4$, etc. (FIGURE 1). Hence the filter 11 will be responding simultaneous to all of the pulses in a substantially long train of pulses J (FIGURE 1) of alternate polarity. The long rise time of the filter converts the length of each negative alternation into an amplitude of proportional value. For each alternation the conversion leads to a proportional negative amplitude. The filter 11 output G is continuously the algebraic sum of the responses of a large group of successive pulses. The pulse lengths ($JP_1$, $JN_2$, etc.) are randomly distributed with the final result that the random signal G at point 12 approaches the true Gaussian amplitude probability distribution of FIGURE 3.

My invention, for example, with an output band width of 40 Hz., has a pulse frequency ($1/h$) of 2500 Hz., the pulse being 5 microseconds long. The peak to peak swing (2 v.) of wave form J is 4 volts.

Figure 5:
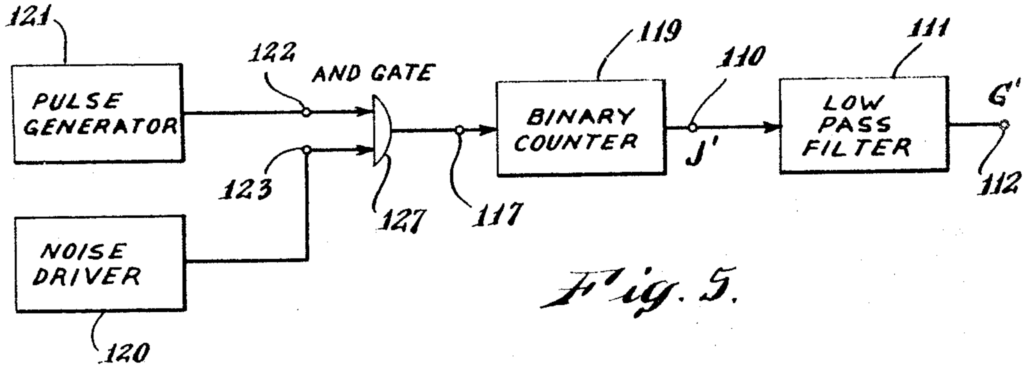
FIGURE 5 is a schematic diagram of another embodiment of the invention.

In another embodiment shown in FIGURE 5 a single AND gate 127 is driven by the noise driver circuit 120 similar to noise driver circuit 20. The AND gate 127 has one input point 122 from the pulse generator 121 and the other input point 123 from the noise driver 120.

A binary counter 119 receives the signal from the foregoing described circuit at input point 117. The binary counter 119 converts the signal wave into a squared wave form $J^1$ similar to that (J) described in the preferred embodiment performed by the multivibrator 19. Filter 111 performs the same tasks as described for filter 11 in the preferred embodiment resulting in a Gaussianly distributed random noise signal $G^1$.

Figure 6:
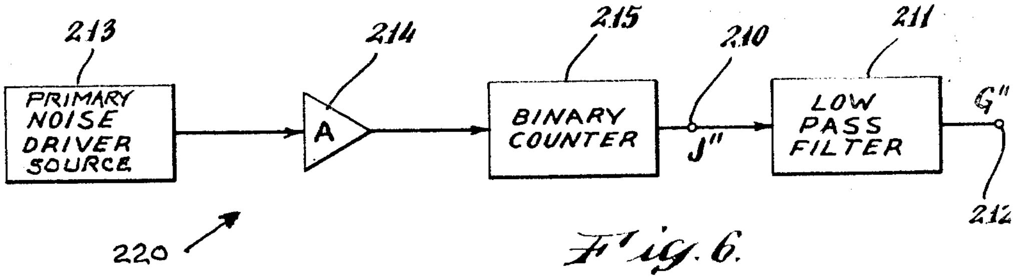
FIGURE 6 is a schematic diagram of still another embodiment of the invention.

Still another embodiment which has all the virtues of the previous embodiments in producing noise of Gaussian probability distribution, symmetry and flat spectral density but which dispenses with the ability to yield a standard of random noise in terms of well established physical contents is shown in FIGURE 6. The noise driver circuit 220 comprises a primary noise source 213, an amplifier 214 which is optional, and a binary counter 215 and is analogous in its operation to the previously described embodiments. The binary counter 215 converts the noise signal into a clipped or squared wave $J^{11}$, similar to wave J at point 10 of FIGURE 1 except that the probability of the pulse duration is not accurately known.

Figure 7:
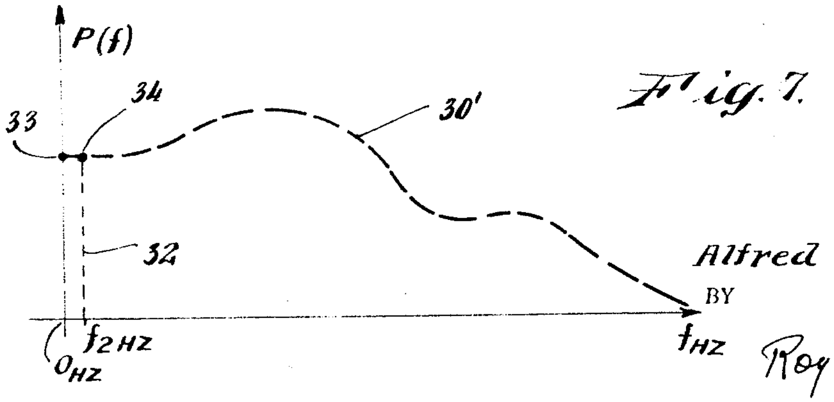
FIGURE 7 is a graph illustrating the power spectral density of the embodiment shown in FIGURE 6.

The wave $J^{11}$ at point 210 has a power spectral density as shown on the plotted graph in FIGURE 7 of curve $30^1$ where the ordinates $P(f)$ represent the power spectral density and the abcissae frequency, $f$. The flat solid line 33–34 exists for all primary noise sources and datum levels being flat from 0 Hz. to a frequency $f$ Hz. The broken line portion of the curve $30^1$ is usually unknown and varies from noise source to noise source and with time for a given noise source.

Filter 211 passes the low frequencies and algebraically sums up the responses of a large group of successive pulses $J^{11}$ resulting in a random signal $G^{11}$ of Gaussian amplitude probability distribution.

In the examples which I have described I have used the term "AND" gate but I do not limit myself to this term as any electronic gate circuit which will perform the same logic can be used. Likewise in using the term "multivibrator" I do not wish to limit myself as any two state circuit which will produce the desired rectangular wave form is usable.

Although I have described my invention with a certain degree of particularity, it is understood that the present disclosure has been made only by way of example and that numerous changes in the details of construction and the combination and arrangement of parts may be resorted to without departing from the spirit and the scope of the invention.

I claim as my invention:

1. An apparatus for producing randomly variable amplitude signals having a flat white spectral density with Gaussian probability distribution comprising a primary noise signal circuit having a first output state and a second output state; a filter having a frequency pass band relatively low to the total spectrum over which its input signal has significant power; a two state circuit driving said filter; a plurality of gate circuits driving said two state circuit; a signal generator producing signals at a fixed frequency; said gate circuits receiving said fixed frequency signals and said first and second output states of said primary noise circuit so that the duration of a signal in a given state of said two state circuit follows a binary probability distribution as the said gate are respectively energized by said first and said second output states of said primary noise signal circuit.

2. An apparatus for producing randomly variable amplitude signals having a flat white spectral density with Gaussian probability distribution comprising a primary noise signal circuit having a noise first output state and a noise second output state; a filter having a frequency pass band relatively low to the total spectrum over which its input signal has significant power; a two state circuit driving said filter upon receipt of signals from a gate circuit; a first gate circuit; a second gate circuit; a pulse generator producing signals at a fixed frequency; said gate circuits receiving said fixed frequency signals; said noise first output state driving said first gate circuit and said noise second output state driving said second gate circuit so that the duration of a signal in a given state of said two state circuit follows a binary probability distribution as the said gates are respectively energized by said noise first and said noise second output states.

3. In the device of claim 1 said primary noise circuit comprising a primary noise source driving a binary counter; said binary counter producing said first output state and said second output state.

4. In the device of claim 3 an amplifier means connected between said primary noise source and said binary counter to amplify the signal output of said primary noise source.

5. In the device of claim 2 said gate circuits comprising AND gates.

6. In the device of claim 1 said two state circuit comprising a bistable multivibrator.

7. In the device of claim 2 said first output state having opposite phase relationship to said second output state so that when one of said gate circuits is closed the other gate circuit is open.

8. An apparatus for producing randomly variable amplitude signals having a flat white spectral density with Gaussian probability distribution comprising a primary noise signal circuit having a first output state and a second output state; a pulse generator producing signals at a fixed frequency; an AND gate receiving the signal output of one of said output states and the output of said generator; a binary counter driven by the output circuit of said AND gate; said counter having an output circuit for driving a filter circuit; said filter circuit having a frequency pass band relatively low to the total spectrum over which the signal has significant power.

9. An apparatus for producing randomly variable amplitude signals having a flat white spectral density with Gaussian probability distribution comprising a primary noise source generating a signal output for driving a binary counter; a binary counter; means connecting said source with said counter; one of the states of said binary counter having an output for driving a filter circuit; said filter circuit having a frequency pass band relatively low to the total spectrum over which the signal has significant power.

10. In the device of claim 9 said connecting means comprising a circuit for amplifying the signal output of said primary noise sources.

References Cited

UNITED STATES PATENTS

| | | | |
|---|---|---|---|
| 2,773,185 | 12/1956 | Fulton et al. | 331—78 |
| 3,208,008 | 9/1965 | Hills | 331—78 |

ROY LAKE, Primary Examiner

SIEGFRIED H. GRIMM, Assistant Examiner

U.S. Cl. X.R.

307—289; 328—157